(12) United States Patent
Fuehrer et al.

(10) Patent No.: US 8,320,262 B2
(45) Date of Patent: Nov. 27, 2012

(54) BUS SYSTEM AND METHOD AND DEVICE FOR TRANSMITTING COMMUNICATIONS ON A BUS SYSTEM

(75) Inventors: Thomas Fuehrer, Gerlingen (DE); Bernd Mueller, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 2647 days.

(21) Appl. No.: 10/406,782

(22) Filed: Apr. 3, 2003

(65) Prior Publication Data

US 2004/0228366 A1    Nov. 18, 2004

(30) Foreign Application Priority Data

Apr. 15, 2002   (DE) .................................. 102 16 674

(51) Int. Cl.
*H04L 12/26*    (2006.01)
(52) U.S. Cl. ..................................................... 370/252
(58) Field of Classification Search .............. 370/252, 370/392, 342, 489
See application file for complete search history.

(56) References Cited

U.S. PATENT DOCUMENTS

| | | | |
|---|---|---|---|
| 5,163,055 A | 11/1992 | Lee et al. | |
| 5,668,810 A | 9/1997 | Cannella, Jr. | |
| 5,708,831 A | 1/1998 | Schoen | |
| 5,854,840 A | 12/1998 | Cannella, Jr. | |
| 6,374,036 B1 * | 4/2002 | Ryan et al. | 386/261 |
| 6,405,340 B1 | 6/2002 | Irvin et al. | |
| 6,700,881 B1 * | 3/2004 | Kong et al. | 370/335 |
| 6,914,885 B2 * | 7/2005 | Rao et al. | 370/252 |
| 7,020,123 B2 | 3/2006 | Park et al. | |

FOREIGN PATENT DOCUMENTS

| | | |
|---|---|---|
| EP | 0 464 014 | 1/1992 |
| EP | 0 616 286 | 9/1994 |
| WO | 01/03356 | 1/2001 |

* cited by examiner

*Primary Examiner* — Man Phan
*Assistant Examiner* — Nourali Mansoury
(74) *Attorney, Agent, or Firm* — Michael J. Striker

(57) ABSTRACT

A method and device for transmitting communications on a bus system, as well as a bus system, is provided, in which the communications are transmitted in communication frames and the communication frames and the communications contain a security sequence. In the bus system, communications of various lengths can be transmitted, and for all of the communications to be transmitted in the bus system, a maximum length of a communication is provided. A first code is contained in the communication frame, by means of which the maximum length of the respective communication to be transmitted can be specified.

14 Claims, 2 Drawing Sheets

BUS SYSTEM AND METHOD AND DEVICE FOR TRANSMITTING COMMUNICATIONS ON A BUS SYSTEM

BACKGROUND OF THE INVENTION

The present invention relates to a method and device for transmission of communications on a bus system, as well as a corresponding bus system.

The networking of control apparatus, sensors, and actuators, with the aid of a communication system or bus system, has drastically increased in the last years in the construction of modern motor vehicles or also in machine construction, in particularly, in the area of machining tools and automation. Synergy effects by separating of function to multiple control apparatus can thereby be achieved. One then speaks in this connection of divided or separated systems. The communication between various stations or participants is to be found more and more via a bus or a bus system. The communication traffic on the bus system, access mechanism, and receiving mechanism as well as error treatment are controlled by means of a protocol.

As protocol in Kfz-region, the CAN (controller area network) is established. This is an event-controlled protocol, that is, protocol activities, such as sending of a message or communication, are initiation by the event, which have their origin externally of the communication system itself. The specific access to the communication system or bus system is enabled via a priority-based bit processing. A supposition is that each message or communication is to be assigned a specific priority. The CAN protocol is very flexible. An addition of further segments and messages is therefore possible without a problem, so long as free priorities are available.

An alternative arrangement to such an event-controlled spontaneous communication is the pure time-controlled application. All communication activities on the bus are strictly periodic. Protocol activities, such as the sending of a communication, are only tripped by means of the progression of a valid time for the entire bus system. The access to the medium is based on the assignment of time ranges or time sections, in which a sender has an exclusive sending right. An addition of new segment is then possible, when previously, the corresponding time section becomes free. This condition forces the communication series already before putting into operation to be established, whereby a schedule is set, which the requirements of repetition rate, redundancy, deadlines, and so forth must satisfy.

Related to the event-controlled application and the pure time-controlled application, a time-controlled CAN application, the so-called TTCAN (time triggered controller area network) is also known. This satisfies the above-described requirements of a time-controlled communication as well as the requirements of a known measure of flexibility. The TTCAN fulfills this through the construction of the communication cycle (basic cycle) in a so-called exclusive window of time or time section for periodic communications of a determined communication participant or substation and in a so-called operating window of time or time section for spontaneous communications of multiple communication substations or participants.

Related to the named bus system is a plurality of bus systems or communications systems for connecting substations or participants in separate systems. In such communication systems, such as, for example, CAN, TTP/C, Bytelight or FlexRay, it is possible to send communications of various lengths. The maximum length of the communication or communication frame, in which these are transmitted, is defined thereby offline as a part of the protocol specification, so that a communication frame can be contained between 0 and n data bytes (n is therefore a protocol-specific constant with n∈N0). It is common in all of these protocol that the communication content is secured by means of the addition, in practice, onto the communication content, that is, the communication itself, of a computed security sequence, generally, as binary information, in particular as bits or bytes. That is, the entire communication frame comprises frame parameters, such as, for example, initiation and end bits, the data, and the security sequence. Typically, this security sequence is computed via a security polynomial, in particular, a CRC polynomial (CRC: cyclical redundancy check). This allows bit errors to be detected through the inconsistency between data and CRC bits in a very simple manner. Therefore, it is possible to recognize, with certainty, errors, which are less than a determined amount K (K∈N0), that is, contain changed bits. K corresponds therefore with Hamming distance, whereby the value of K is determined by the selection of the security polynomial. With a controller area network, this Hamming distance, for example, can be K=6. With an optimal selection of the Hamming distance, however, the essentially limiting parameters are the maximum communication length as well as the number of supplementary bits. Thus, for example, with 16 supplementary bits and a maximum communication length of 50 data bytes, it is not possible to maintain a Hamming distance of 6, that is, K=6. This is only an example, which shows that a statistically maximum communication length used until now can produced problems in the frame of securing the data transmission.

Thus, as indicated above, the state of the art does not provide optimal results in each respect. Therefore, it is an object of the present invention to resolve the above-described problem and to improve the situation for securing communications, in particular, to achieve a high flexibility.

SUMMARY OF THE INVENTION

The present invention relates to a method and device for transmitting communications on a bus system, as well as a corresponding bys system, whereby the communications are transmitted in communication frames and the communication frames, in addition to the communication, also contain a security sequence, whereby in the bus system, communications of various lengths can be transmitted and for all communications to be transmitted in the bus system, a maximum length is specified, whereby in an advantageous manner, a first code is contained in a communication frame, through which, the maximum length of the respective communication to be transmitted can be specified. Therefore, the invention describes in an advantageous manner a method, which permits the maximum communication length to be dynamically changed.

A further advantage is that the security sequence is dependent on the first code or the specified maximum length of the communication to be transmitted. Similarly, the advantage is provided that the security sequence is formed through a security polynomial and the security polynomial is specified dependent on the first code or the predetermined maximum length of the communication to be transmitted. That is, it is not only possible to dynamically change the maximum communication length, but likewise, to dynamically change this security polynomial suited to this communication length for frame formats or communication frame formats, like the security sequence itself.

In to this purpose, a second code is contained in the communication frame, which produces the actual communication length, whereby this second code is adjusted depending on the first code. Thereby, the second code can be adjusted such that a length, in particular, the bit or byte count of the second code, is changed and/or that the second code is adjusted, such that a measuring unit, in particular, the validity of the corresponding bits or bytes for the second code is changed.

In one advantageous embodiment, the communications or the corresponding communication frames are subdivide in a total count of communication classes with at least two different communication classes. In this manner, the maximum length of the communication to be transmitted is specified by the first code in an advantageous manner for a first number quantity of communication classes, and for a second number of communication classes, the first code is specified as the standard value, whereby, for the second quantity, one of each communication class is provided with the same, maximum length of the communication and the variability or flexibility of the dynamic change of the maximum communication length for the first quantity of communication classes remains the same.

A further advantageous possibility, then, is to include the first code merely in the communication frames of an undercount of communication classes, whereby this undercount is less than the total count of the communication classes.

In this regard, it is particularly advantageous if the maximum length of the communication to be transmitted and/or the first code as well as a length of the security sequence and/or also the security polynomial itself are specifically associated with one another.

In an advantageous manner, therefore, the first code is specified as binary information, even particularly, as a bit or byte value, whereby the length of the binary information, that is, particularly, the bit or byte number is determined dependent on the entire number of communication classes. Equally advantageous is when the length of the binary information is provided dependent from the first quantity and/or second quantity of communication classes.

An advantageous further embodiment of the invention shows a first and a second security polynomial, whereby the polynomial is formed, such that the second security polynomial is part of the first security polynomial. In particular, with implementation of polynomial hardware for multiple alternatives, it is more cost-effective, in a security block, in particular, the security polynomial, to choose as a continuation the smaller security block or security polynomial, so that only the costs for the larger block or larger polynomial are retained, since the smaller is part of the larger.

By knowledge of the invention, it is advantageous it associated a storage unit in a bus system, for example, a communication buffer or another storage, I particular for preparing of the communication or communication frame before transmission of the bus system, which is separated into storage regions, that is, to provide or separate the storage regions depending on the first code of the communication, since then, the controller implementation can be retained cost-effectively, when the maximum length of the communications need not be met for all of the communication objects. In this connection, the storage or storage block, even dependent from the first code, which shows the different lengths of the communication objects, can be so configured that smaller storage space must be used.

So, in an advantageous manner, a short frame format can be used for short communications.

For the case that dynamic communication provides the band width with reference to the transmission, a band width advantage is provided with from the invention.

At the same time, the possibility of optimizing the compatibility with reference to the communication transmission with a high measure of flexibility improves.

Further advantages and advantageous embodiments are provided in the description as well as the features of the claims.

BRIEF DESCRIPTION OF THE DRAWINGS

The invention will next be explained with reference to the accompanying figures.

DETAILED DESCRIPTION OF THE PREFERRED EMBODIMENTS

Figure 1:
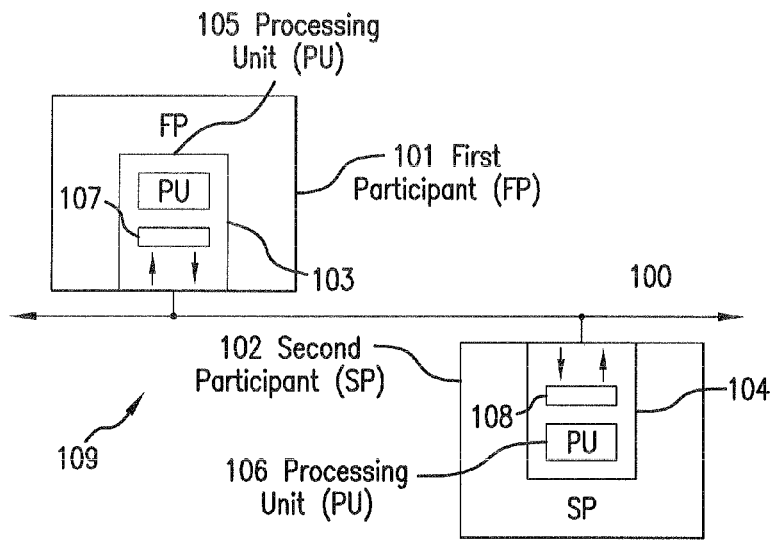
FIG. 1 shows a divided system, that is a network system or bus system with at least one substation or participant, as well as means for performing the inventive method.

FIG. 1 shows a bus system 10 with a first participant ("FP") 101 and a second participant ("SP") 102, that is, a divided system. Since the communication is possible through the participant itself or the computer units or control units contained therein as well as through separate control units, for example, a bus controller, which is supported internally or externally with reference to the participant, the terms bus system and divided system, as well as communication system, will be used to the same effect in the following description. That is, the bus system can be the pure communication connection with control units for maintenance or performance of the communication as well as the communication connection with connected participants, which on their side, perform the communication, as well as a variety of mixed systems.

The participants 101 and 102 show an interface 103 or 104 to the bus 100 with a processing unit ("PU") 105 or 106 and a storage device, in particular, a buffer storage 107 or 108. The processing unit and the buffer storage are accommodated in a bus controller, for example, more specifically, the interface unit 103 or 104.

To facilitate viewing, here only one concrete embodiment is represented. Of course, it is also contemplated that the processing units 105 or 106 and/or the buffer or storage units 107 and 108 are not directly accommodated in the bus controller or bus processing unit or bus interface 103 or 104, rather are accommodated in a desired combination in the participant or out of the participant, that is, the buffer storage could be accommodated externally or internally or also in the participant itself. The same is true for the process units 105 and 106.

Figure 2A:
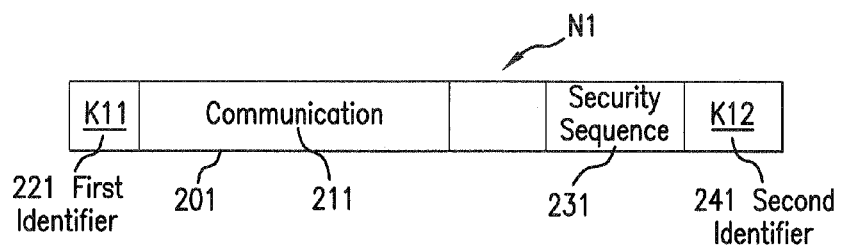
FIG. 2 shows various communication frames or communication formats with different maximum lengths of the message for explanation of the inventive subject matter.
Figure 2B:
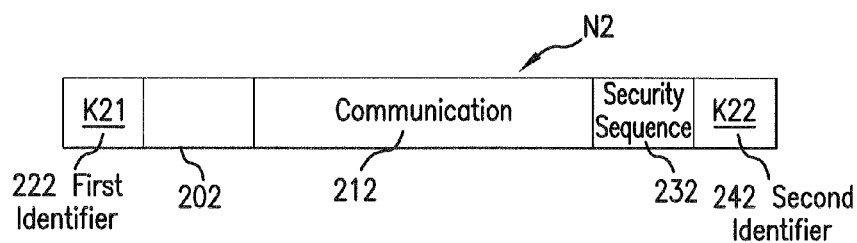

By means of the bus or divided system 109 represented in FIG. 1, communication of various lengths can be transmitted. Different communication frames are therefore represented in FIG. 2, which comprises FIGS. 2a, 2b, and 2c. FIG. 2a shows a communication frame N1, whereby the entire frame is designated with 201. This frame contains a first identifier K11 in field 221, which provides the maximum length of the communication or communication frame N1. The communication itself within the communication frame Ni is localized in block 211, whereby the size of the block 211 can convey the maximal length of the communication in the communication frame N1. A security sequence is localized in block 231, in particular, formed by a security polynomial. In the frame of the security polynomial or for plotting of the security sequence, likewise for the testing of the security sequence, security method are used, in particular, cyclical security methods, such as the cyclical redundancy check CRC. A second identifier K12 of the communication frame Ni is located with block 241, which designates the actual communication length in block 211. That is, only in special cases, if the communication possesses the maximum communication length, the same identifier could also be used for K11 and K12. In other cases, the maximum possible communication length differs from the actual communication length localized in block 211. In particular, block 241 is optional, that is, the second identifier can be provided, but does not have to be provided. In FIG. 2b, communication frame N2 is illustrated, which enables a greater maximum communication length according to block 212. In block 222, a first identifier for communication frame N2 is designated with K21 and a second identifier K22 of this communication frame N2 is designated with block 242. Block 232 contains, in turn, a security sequence, which, for example, through use of a different security polynomial, is fulfilled particularly shorter than the communication frame N2 in block 231.

Figure 2C:
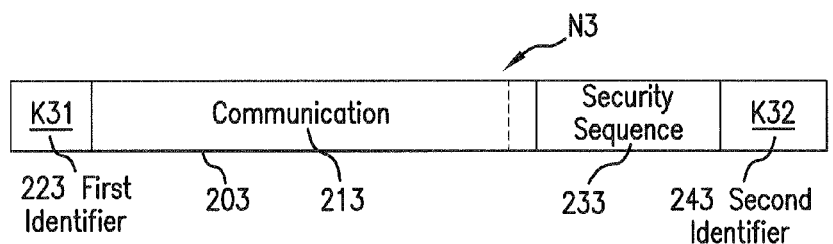

A further communication frame N3 is shown in FIG. 2c. This communication frame with block 203 has again a different maximum length of the communication in block 213. This maximum length is coded in block 223 with a first identifier or a second identifier K31. It is again optional to represent a second identifier K32 in block 243, which also here symbolizes the actual communication length. A further security mechanism, that is, a different security polynomial, generates a security sequence in block 232 as the longest of the three represented security sequences. That is, each maximum communication length in the blocks 211 to 213 and the security polynomials used for the communication frames N1 to N3 provide security sequences of different lengths, represented by the blocks 231 to 233. Depending on the actual communication length, represented by the dashed lines in the blocks 211 to 213 of the communication frames N2 to N3, different identifiers K12, K22, and K32 are provided in the blocks 241 to 243.

A prerequisite for the inventive subject matter, therefore, is the existence of an identifier, that is, at least one bit in the communication frame or frame format, which can be used for differentiating the various communication formats. That is, different maximum lengths of the communication are distinguished, like the different security polynomials. Next, the description for the Flexray Protocol will be provided. The method, however, is useable in general. Further, it is to be described from one bit, with reference to the identifiers K11, K21, K31, whereby also here a longer identifier or longer code are possible, of course. If one bit is used, specifically, for example, two constructive stages of the communication format are provided. Accordingly, however, as previously mentioned, multiple, for example, successive, constructive stages are also possible.

In Flexray, for example, the MUX bit can be used as the specifically mentioned bit.

In this case, for example,

MUX=0

Use as the frame format the CRC polynomial P1 up to 12 bytes of data and a second identifier, that is, a data length code DLC of 4 bits. The 4 bit value provides, therefore, as noted, the used length of the data field 0 to 12 in bytes. This corresponds to the standard format.

MUX=1:

Use as the frame format the CRC polynomial P2 up to N2 byte data (depending on the goal, N2 can be 50 or 200 or another value) and a DLC, that is a second identifier, of M=8 bit. The M-value can therefore provide the utilized length of the data field 1 to 256 in the case of M=8 in bytes. The unit, that is, the measuring unit, however, could also be 2 or 4 bytes. The, depending on the goal, under certain circumstances, also the value M=4 can be further used.

In conclusion, then, this means that one can change the frame format via one bit, the changed frame format retains also a changed cyclic redundancy check CRC, and in case in the frame format also an input of the actually utilized communication length, a DLC field (second code) is contained, this must also be changed. This change of the second identifier, that is of the DLC field, can take place either by means of an enlargement of the DLC field, such as, for example K32 is greater than K22, or by means of a change of the unit or measuring unit, for example, of one byte to 2 bytes or 4 bytes. Also, both characteristics are possible.

In this connection, an essential advantage of the present invention is that for short communications, a short frame format can be used. If one, for example, has the goal of always guaranteeing a Hamming distance of 6, than one must apply, for example, 3 bytes CRC for long communications, although with short communications also 2 bytes are sufficient for the CRC. In addition, the data length field is to be set at the maximum size. Therefore, one can save band width, specifically when short communications are the case.

This is particularly true, then, if, for example, with Flexray, dynamic communications separate the band width. Then, a spontaneous length change via the Applications-Know-How leads to a band width benefit. Therefore, the possibility is provided of retaining compatibility. In individual cases, this is very important.

The illustrated invention need not necessarily be used on all communications. If, for example, in particular via protocol or also application, there are distinctions between various communication classes, then the first identifier for a communication class can be employed, and therewith, a dynamic change of the maximum communication length can be achieved and for at least one other class, either the identifier is not used at all or a default configuration is used, that is, a standard value, whereby the entire class contains a uniform maximum communication length. Therefore, the named flexibility in the frame of the dynamic communication adjustment can be limited on individual communication classes.

If one, as previously mentioned, ha more than one bit in the frame format, more classes can be differentiated, according to the number of bits. This is also possible successively, that is, in the original classes, one has only 1 bit, and in an extended format, one adds a new bit, which can be used again, and so on.

In order to remain cost-effect with a controller implementation in the frame of the inventive subject matter, it is advantageous to not maintain the storage for all communication objects n the maximum length; rather, it is more cost-effective, for example, to configure a provided storage block, in particular, in the frame of the storage devices 108 and 107, for example, to the size of 256 bytes, alternatively, for example, in 4×64, 8×32, 16×16, 2×62, and 8×16 (and so forth) byte blocks. It is particularly advantageous to make this configuration dependent on the first identifier, since through the first identifier, all maximum communication lengths and therewith, in particular, also maximum communication frame lengths can be determined, so that a very well-determined use of the storage can take place.

In addition, it is possible to implement the CRC hardware for the two alternatives for use of one bit and two classes separately. The same is true for multiple classes. A cost-effective advantage is that the second, for example, larger CRC block is selected as a continuation of a smaller of the first CRC block, because this means in the hardware that only the costs for the larger CRC block are retained, since the smaller CRC block is part of the larger.

Figure 3:
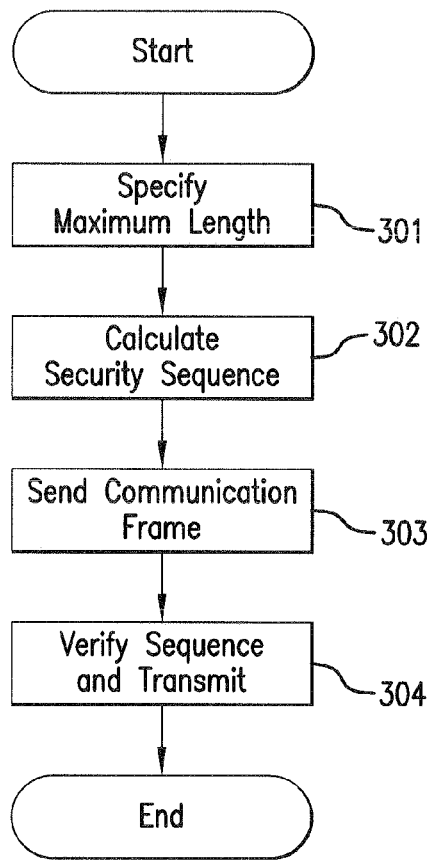
FIG. 3 shows again, by way of example, one use of the inventive method in a flow diagram.

In FIG. 3, the course of the method of the present invention is sketched. After the start of the method, a corresponding communication frame is processed in block 301. The communication to be transmitted is laid as the foundation in this block 301. A first identifier is provided to this communication to be transmitted, which is added to the communication frame. By this identified, the maximum length of the communication to be transmitted is specified in block 301 ("SPECIFY MAXIMUM LENGTH"). In block 302, the security polynomial, in particular, in the frame of the cyclic redundancy check is run through, and therewith, the security sequence is determined or ("CALCULATE SEQUERITY SEQUENCE"). This likewise is added to the communication frame.

In block 303, the now complete communication, that is, the corresponding communication frame is sent to the bus system, for example, from the buffer storage ("SEND COMMUNICATION FRAME").

This, then, is received by a further participant in block 304, which, based on the first identifier, recognizes the maximum length of the respective communication to be transmitted and therewith directly associates the utilized security method, in particular, the corresponding security polynomial, and thereby, the correct communication transmission with the assistance of the security sequence, can be checked ("VERIFY SEQUENCE AND TRANSMIT"). Therefore, the communication transmission can be completed and the method performed.

Optionally, the second code in block 301 or block 302, specifically, the code for the actual communication length, ca be added in the communication frame. Further bits, which are not essential to the present invention in the frame of a communication transmission, are not specifically mentioned on the basis of facilitating explanation, are not mentioned here and also are not shown in FIG. 2.

Therefore, the present invention provides a method, a device and a bus system, as well as a storage, a storage device, which permits the maximum communication length together with a security polynomial suited for this communication length for dynamically changing the frame format, in order to have a flexible, adjusted, and optimized frame format for the respective use of the application.

It will be understood that each of the elements described above, or two or more together, may also find a useful application in other types of constructions differing from the types described above.

While the invention has been illustrated and described herein as a method and device for transmitting communications on a bus system and a bus system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A method for transmitting communications on a bus system,
whereby the communications are transmitted in communication frames comprising a security sequence,
whereby in the bus system, communications of various lengths can be transmitted, and for all communications to be transmitted in the bus system, a maximum length of a communication is specified,
wherein the communication frames contain a first code, and the first code specifies the maximum length of a respective communication to be transmitted,
wherein the communications are subdivided in a total number of communication classes with at least two different communication classes, and
wherein for a first quantity of communication classes, respectively, the maximum length of the respective communication to be transmitted is specified by means of the first code, whereby for a second quantity of communication classes, the first code corresponds to a standard value, whereby one of each communication class is provided with a same maximum length of communications.

2. The method according to claim 1, characterized in that the security sequence is dependent on the first code or the specified maximum length of the communication to be transmitted.

3. The method according to claim 1, characterized in that the security sequence is formed by means of a security polynomial and the security polynomial is specified dependent from the first code or the specified maximum length of the communication to be transmitted.

4. The method according to claim 1, characterized in that a second code is contained in the communication frame, wherein the second code provides an actual communication length, whereby this second code is adjusted depending on the first code.

5. The method according to claim 4, characterized in that the second code is adjusted, such that a length of the second code is changed.

6. The method according to claim 4, characterized in that the second code is adjusted, such that a measuring unit for the second code is changed.

7. The method according to claim 1, characterized in that the total number of communication classes exists, whereby the first code in the communication frame is contained in an undercount of communication classes and the undercount is smaller than the total number.

8. The method according to claim 1, characterized in that the maximum length of the communication to be transmitted and/or the first code as well as a length of the security sequence are specifically associated with one another.

9. The method according to claim 3, characterized in that the maximum length of the communication to be transmitted and/or the first code as well as the security polynomial are specifically associated with one another.

10. The method according to claim 1, characterized in that the first code is specified as binary information, whereby a length of the binary information is specified as dependent on the total number of communication classes.

11. The method according to claim 1, characterized in that the first code is specified as binary information, whereby the length of the binary information is predetermined dependent from the first quantity and/or the second quantity of communication classes.

12. The method according to claim 3, characterized in that a first and a second security polynomial are different, whereby the second security polynomial is part of the first security polynomial.

13. A bus system for transmitting communications with at least two participants, whereby the communications are transmitted in communication frames and a communication frame contains a security sequence, whereby in the bus system, communications of various lengths can be transmitted and for all of the communications to be transmitted in the bus system, a maximum length of a communication is specified, wherein the communication frames contain a first code and the first code specifies the maximum length of a respective communication to be transmitted, wherein the communications are subdivided in a total number of communication classes with at least two different communication classes and wherein for a first quantity of communication classes, respectively, the maximum length of the respective communication to be transmitted is specified by means of the first code, whereby for a second quantity of communication classes, the first code corresponds to a standard value, whereby one of each communication class is provided with a same maximum length of communications.

14. The bus system of claim 13, further comprising: a storage device, for storing the communication frames, whereby the storage device is separated into storage regions, characterized in that second means are contained, which specify the storage regions dependent on the first code of the communication.

* * * * *